Aug. 12, 1952    O. D. WESTERBERG ET AL    2,606,996
ELECTRICALLY HEATED MATTRESS
Filed Jan. 18, 1949    3 Sheets-Sheet 3
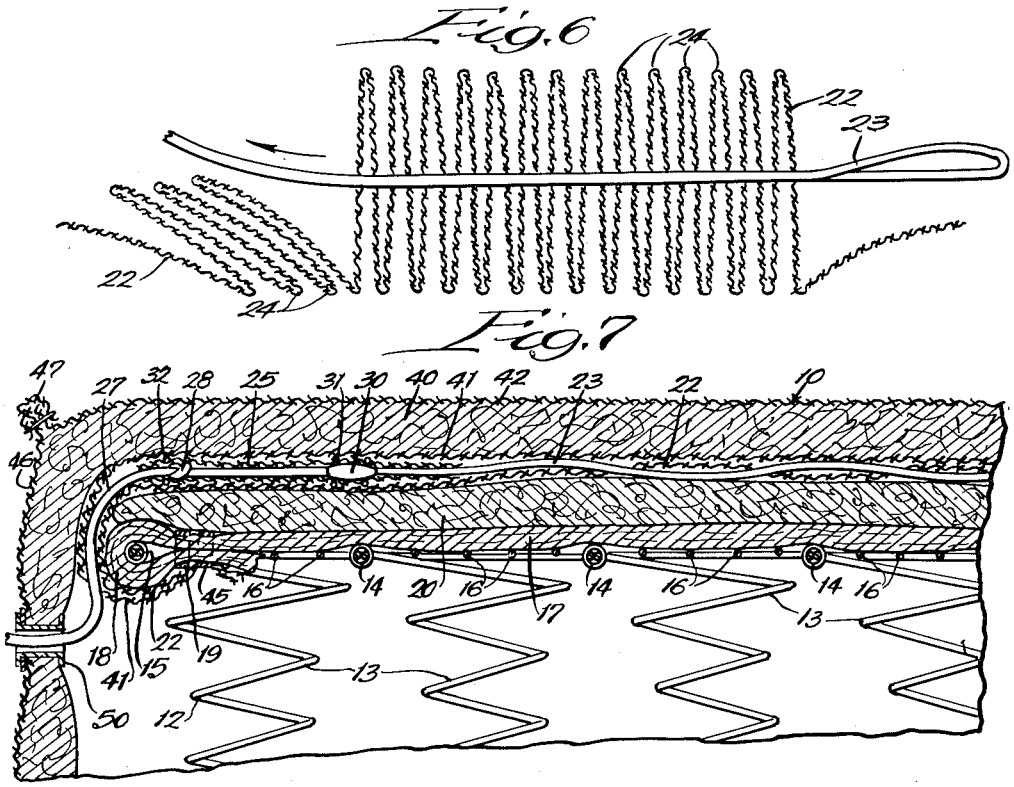
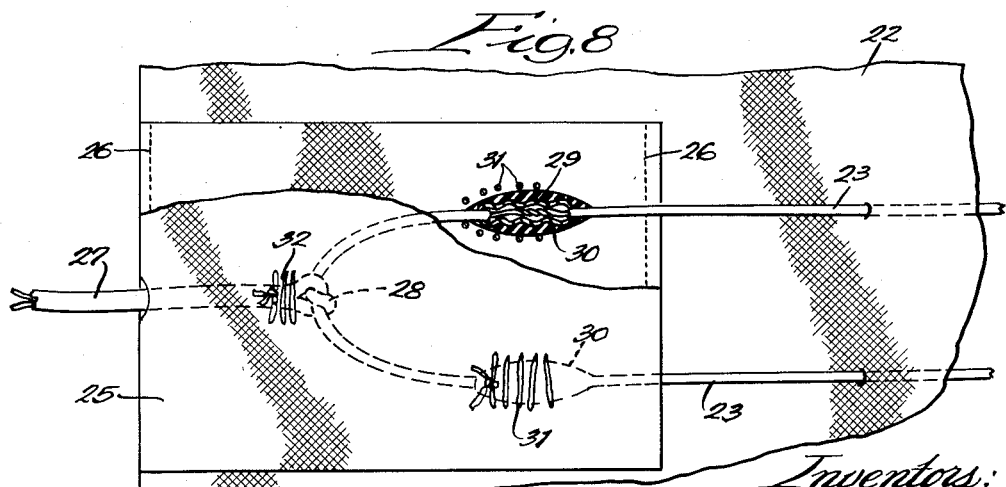
Inventors:
Oliver D. Westerberg
and Wallace H. Englehardt,
By Dawson, Ooms, Brittany Spangenberg,
Attorneys Patented Aug. 12, 1952

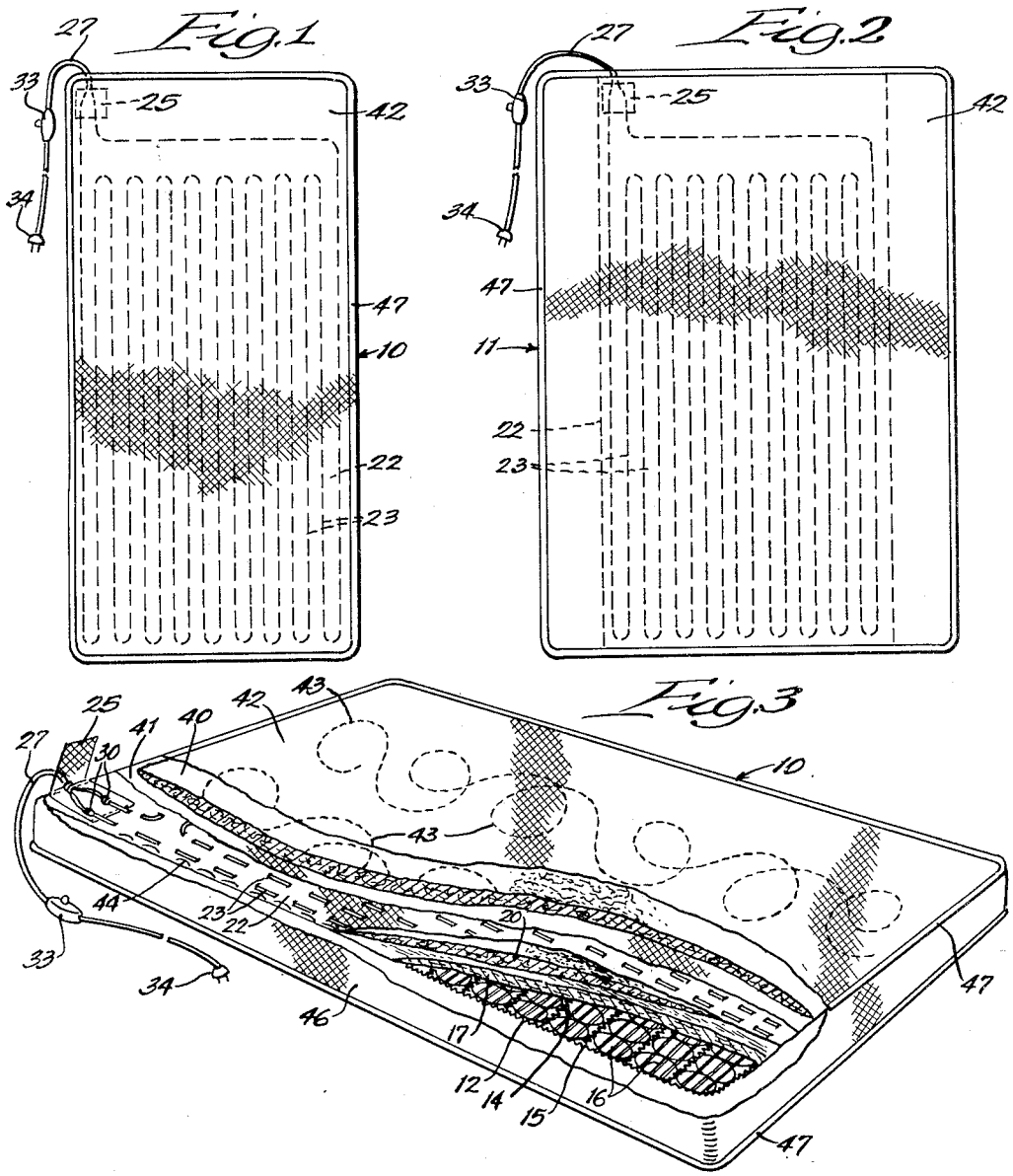

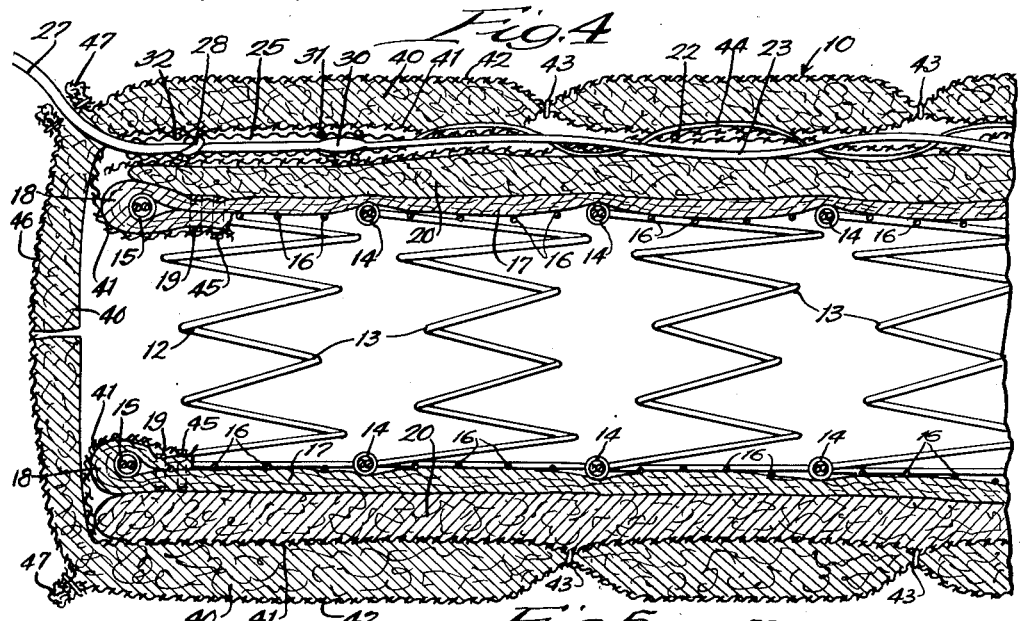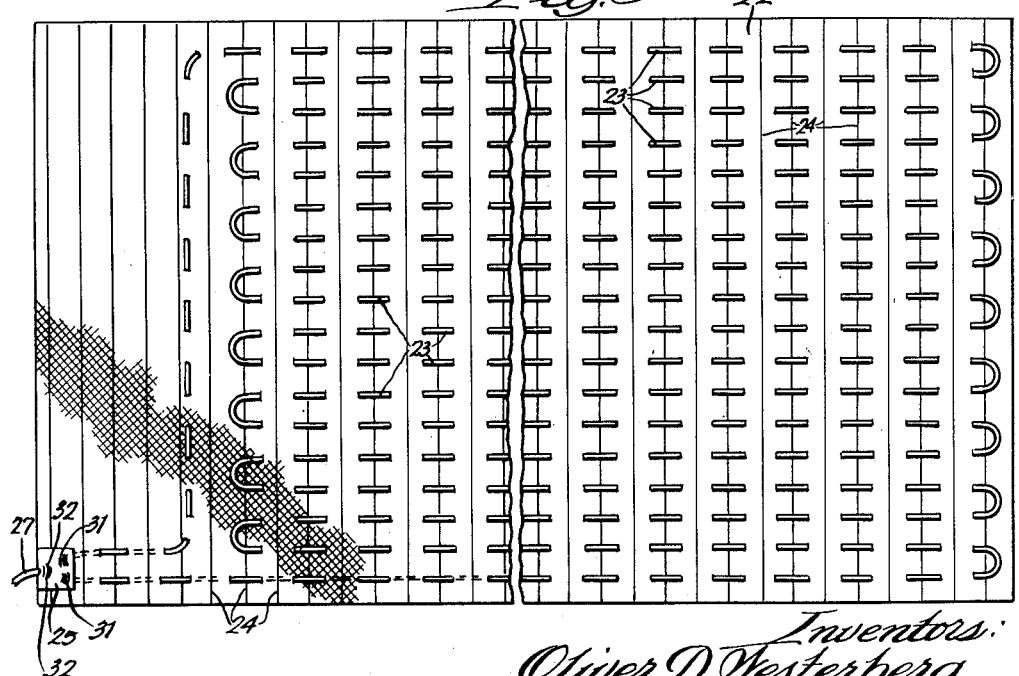

2,606,996

UNITED STATES PATENT OFFICE 2,606,996

ELECTRICALLY HEATED MATTRESS

Oliver D. Westerberg and Wallace H. Englehardt, Chicago, Ill., assignors to Tempret Products, Inc., a corporation of Illinois Application January 18, 1949, Serial No. 71,542

11 Claims. (Cl. 219—46)

This invention is directed to an electrically heated mattress and an electric heating unit therefor.

An object of this invention is to provide an electrically heated mattress which enhances sleeping comfort during cold weather. The mattress of this invention preferably includes an innerspring unit, a wire grid overlying the upper surface of the innerspring unit, a hard fiber pad overlying the grid, a soft fiber pad overlying the hard fiber pad, an electrical heating unit overlying the soft fiber pad and a quilted covering including a soft fiber pad overlying the electric heating unit. In assembling the mattress, the various elements thereof are secured together for the purpose of preventing undue shifting thereof with respect to each other. In this way the electrical heating unit is maintained in fixed position within the mattress.

By experiment and actual use it is found that better sleeping comfort is obtained by the use of the electrically heated mattress of this invention than by conventional heated blankets or quilts now in use. Because the mass of the mattress of this invention, in which the electrical heating unit is inserted, is greater than the mass of a conventional electrically heated blanket or quilt, more uniform and steady temperatures can be maintained and widely fluctuating temperatures are avoided. Since the electrical heating unit is imbedded in the mattress which is usually covered with a suitable blanket or quilt when in use, the heat loss from the electrically heated mattress is considerably less than in the case of an electrically heated blanket or quilt and the electrical heating unit is less affected by changes in ambient temperatures.

Since the electrical heating unit is maintained in fixed relation in the mattress, it cannot be folded or distorted as in the case of the electrical heating units of electrically heated blankets or quilts. Thus, the danger of short circuiting resulting in overheating, spot heating and occasionally fire existing in electrically heated blankets or quilts cannot occur in the electrically heated mattress of this invention. Accordingly, there is no need for safety thermostats, fuses and the like as are at present required in electrically heated blankets or quilts. In fact, the electrically heated mattress of this invention has obtained approval of Underwriters' Laboratories, Inc. even though it includes no thermostatic switches, fuses, or the like.

Another object of this invention is to provide an electrical heating unit for incorporation in a mattress for electrically heating the same. In this connection the electrical heating unit preferably includes a flexible sheet adapted to be secured at its margins to the mattress and an elongated electrically heated element laced at regular intervals through the flexible sheet in regularly spaced reversing rows. The spacing of the lacing and rows is such that when the flexible sheet is held substantially spread it is impossible for one portion of the electrical heating element to contact another portion thereof whereby short circuiting is entirely eliminated. In lacing the electrical heating element in the flexible sheet, the sheet is preferably fan folded at regular intervals, the electrical heating element is reversely threaded through the fan folds at regular intervals and then the flexible sheet is extended to remove the fan folds. In this way the electrical heating element may be quickly and inexpensively laced through the flexible sheet.

In the mattress construction, the wire grid, the hard fiber pad and the soft fiber pad contained between the electrical heating unit and the innerspring unit effectively prevents the electrical heating unit from being contacted by and short circuited by the springs of the innerspring unit. The quilted cover including the soft fiber pad overlying the electrical heating unit effectively prevents the electrical heating unit from being damaged from the surface of the matress. The soft fiber pads on either side of the electrical heating unit operate in conjunction therewith to provide substantially uniform and steady temperature conditions.

A further object of this invention is to provide an improved electrical connection between the electrical heating element of the electrical heating unit and an extension cord which extends outwardly from the mattress whereby dislocation and damage to the electrical heating element by pulling upon the extension cord is entirely eliminated. In this respect a piece of relatively strong material is suitably secured to the flexible sheet for forming a pocket in which the electrical connections are made.

Further objects of this invention reside in the details of construction of the electrically heated mattress and the electrical heating unit therefor and the cooperative relationship between the component parts thereof.

Other objects and advantages will become apparent to those skilled in the art upon reference to the accompanying specification, claims and drawings in which:

Figure 1 is a plan view of the electrically heated mattress of this invention in twin bed size;

Figure 2 is a plan view of the electrically heated mattress of this invention in double bed size;

Figure 3 is a perspective view of the electrically heated mattress of this invention with portions thereof cut away for illustration purposes;

Figure 4 is a vertical sectional view through one form of the electrically heated mattress of this invention;

Figure 5 is a plan view of the electrical heating element;

Figure 6 is a view illustrating the manner of lacing the electrical element in the sheet of the electrical heating unit;

Figure 7 is a sectional view of another form of the electrically heated mattress and Figure 8 is an enlarged plan view of a portion of the electrical heating unit.

The electrically heated mattress of this invention is generally designated at 10 in a twin bed size and is generally designated at 11 in a double bed size. The twin bed mattress 10 is approximately 74 inches long, 38 inches wide and 6½ inches thick and the double bed mattress 11 is approximately 74 inches long, 53 inches wide and 6½ inches thick.

The electrically heated mattress preferably includes an innerspring unit 12 made up of a plurality of coil springs 13 which are bound together by wire lacing 14. The marginal edges of the innerspring unit 12 are provided with a border frame 15. In this respect the innerspring unit is of conventional construction.

Overlying the upper surface of the innerspring unit 12 is a wire grid formed of a plurality of spaced parallel wires 16 suitably maintained in spaced relation. Overlying the wire grid is a hard fiber pad 17 such as a sisal pad. The marginal edges of the pad are rolled over the border frame 15 as at 18 and suitably secured as by staples 19. Overlying the hard fiber pad 17 is a soft fiber pad 20 such as a six pound cotton felt pad.

The electrical heating element overlies the soft fiber pad 20 and it includes a flexible sheet 22 formed of cotton muslin. Preferably the flexible sheet is substantially 72 inches long and 36 inches wide and the same sheet may be utilized for twin bed mattresses as well as double bed mattresses. The electrical heating element 23 is laced through the flexible sheet at regular intervals in regularly spaced reversing rows. The rows extend substantially to the foot margin and the side margins of the flexible sheet but are spaced from the head margin thereof. In lacing the electrical heating element 23 through the flexible sheet 22, the flexible sheet is preferably fan folded at regular intervals at 24 as illustrated in Figs. 5 and 6. The electrical heating element is then reversely threaded through the fan folds at regularly spaced intervals and then the flexible sheet is extended to remove the fan folds whereupon the lacing appears as in Fig. 5.

The electrical heating element consists of a "Fortizen" core upon which is wrapped a "cupron" wire of BS gauge #35 at about 40 turns per inch. The wound wire is covered with a vinyl chloride plastic covering such as VG-55. The heating element thus formed has about three ohms per foot resistance at .5 ampere. About 85 feet of the heating element is laced into the flexible sheet. The lacing of the heating element in the flexible sheet is regular at about 2 inches and the rows are regularly spaced apart about 2 inches. The effective area of the heating element is therefore about 52 inches x 34 inches. There is substantially a 2 inch margin at the sides and the foot of the heating element and an 18 inch margin at the head of the element.

The two ends of the heating element 23 terminate in a pocket 25 formed of a heavy material such as canvas, as illustrated in more detail in Fig. 8. The pocket 25 is formed by folding the canvas and stitching the bottom thereof as at 26 to the flexible sheet 22. An extension cord 27 enters the pocket 25 through a hole in the fold and the extension cord is preferably knotted within the pocket as at 28. The two wires of the extension cord are electrically connected respectively to the two ends of the heating element 23 by means of metallic pressure clamps 29 which are in turn bound and insulated by plastic tape 30. The pocket is closed and the joints 30 are bound in the pocket by heavy mattress twine 31 and likewise the knot 28 is bound in the pocket by heavy mattress twine 32. Thus, the heating element and the extension cord and the connections therebetween are securely bound within the pocket 25 which in turn is securely held on to the flexible sheet 22. This provides for a strain relief to prevent damage to the heating element and its connection to the extension cord in the event that the extension cord should be yanked. The extension cord 27 may be provided with a suitable switch 33 and a wall plug 34.

Overlying the electrical heating unit is a quilted covering having a soft fiber pad 40, an undersheet 41 and a covering sheet 42. Preferably the soft fiber pad is made from 6 pound cotton felt, the under sheet from muslin and the covering sheet from suitable ticking. The pad, undersheet and covering sheet are preferably quilted as at 43.

As shown in Figs. 3 and 4, the flexible sheet 22 of the electrical heating element may be secured at its margins to the undersheet 41 of the quilted pad as by stitching 44. Since the electrical heating unit is thus marginally secured to the quilted cover it is held in extended position and danger of crossing and contacting of adjacent portions of the electrical heating element 23 is entirely eliminated. The stitching 44 is somewhat loose to provide a limited degree of strain release between the electrical heating unit and the quilted cover, but yet, maintains the electrical heating unit in extended condition.

The soft fiber pad 40 and the undersheet 41 of the quilted cover marginally extend beyond the innerspring unit and the marginal edges of the undersheet 41 are carried over the rolled edge 18 of the hard fiber pad 17 and secured thereto by staples 45. In this way the quilted cover and the electrical heating element are firmly secured to the innerspring unit. The soft fiber pad 40 extends downwardly over the side of the mattress for padding the side. A side panel 46 covers the sides of the mattress and is secured to the cover sheet 42 of the quilted cover in a suitable seam 47. As shown in Fig. 4 the extension cord 27 may extend outwardly from the mattress through the seam 47.

The form of the electrically heated mattress illustrated in Fig. 7 is essentially the same as that illustrated in Fig. 4 and like reference characters for like parts have been utilized. It differs, however, in the manner of securing the electrical heating element to the mattress and the manner of bringing out the extension cord. In Fig. 7 the flexible sheet 22 of the electrical heating element is made larger than heretofore explained and instead of being stitched to the undersheet of the quilted cover, it is secured to the innerspring unit by staples 45. If desired, the staples 45 may also secure the undersheet 41 of the quilted cover to the innerspring unit. Instead of extending the extension cord 27 through the seam 47 it may be extended outwardly from the mattress through a suitable grommet 50 carried by the side panel 46 of the mattress.

The electrical heating unit is located between the two soft fiber pads 20 and 40 and is therefore protected against damage from the exterior of the mattress or from the innerspring unit. The wire grid and the hard fiber pad effectively prevent the soft fiber pad 20 from working into the coil springs of the innerspring unit and therefore adds to the protection afforded the electrical heating unit. Since there is considerable mass on either side of the electrical heating unit, widely fluctuating temperatures are avoided and uniform and steady temperatures are maintained.

While for purposes of illustration two forms of this invention have been disclosed, other forms thereof may become apparent to those skilled in the art upon reference to this disclosure, and therefore, this invention is to be limited only by the scope of the appended claims.

We claim as our invention:

1. An electrical heating unit for incorporation in a mattress for electrically heating the same comprising, a flexible sheet adapted to be secured at its margins to the mattress, an elongated electrical heating element laced at regular intervals through the flexible sheet in regularly spaced reversing rows, a fabric piece folded upon itself and secured to the flexible sheet adjacent one corner thereof to provide a pocket, the ends of the electrical heating element terminating in the pocket, a two wire extension cord extending into the pocket and the wires thereof knotted together within the pocket, electrical connections in the pocket between the ends of the electrical heating element and the ends of the wires of the cord, and twine for binding the electrical connections and the knotted cord to the fabric piece forming the pocket.

2. An electrical heating unit for incorporation in a mattress for electrically heating the same comprising, a flexible sheet having side margins and head and foot margins and adapted to be secured at its margins to the mattress, an elongated electrical heating element laced at regular intervals through the flexible sheet in regularly spaced reversing rows parallel to the side margins, the rows extending substantially to the foot margin of the flexible sheet but spaced from the head margin thereof, a fabric piece folded upon itself and secured to the flexible sheet adjacent the head margin thereof to provide a pocket, the ends of the electrical heating element terminating in the pocket, a two wire extension cord extending into the pocket and the wires thereof knotted together within the pocket, electrical connections in the pocket between the ends of the electrical heating element and the ends of the wires of the cord, and twine for binding the electrical connections and the knotted cord to the fabric piece forming the pocket.

3. An electrically heated mattress comprising, an innerspring unit, a wire grid overlying the upper surface of the innerspring unit, a hard fiber pad overlying the grid, a soft fiber pad overlying the hard fiber pad, and electrical heating unit overlying the soft fiber pad and including a flexible sheet and an elongated electrical heating element laced at regular intervals through the flexible sheet in regularly spaced reversing rows, and a quilted cover including a soft fiber pad overlying the electrical heating unit.

4. An electrically heated mattress comprising, an innerspring unit having a border frame, a wire grid overlying the upper surface of the innerspring unit, a hard fiber pad overlying the grid and extending over and secured to the border frame of the innerspring unit, a soft fiber pad overlying the hard fiber pad, an electrical heating unit overlying the soft fiber pad and including a flexible sheet and an elongated heating element laced at regular intervals through the flexible sheet in regularly spaced reversing rows, a quilted cover overlying the electrical heating unit and including a soft fiber pad and an undersheet which extends over and is secured to the border frame of the inner spring unit, the flexible sheet of the electrical heating unit being marginally secured to the under sheet of the quilted cover.

5. An electrically heated mattress comprising, an innerspring unit having a border frame, a wire grid overlying the upper surface of the innerspring unit, a hard fiber pad overlying the grid and extending over and secured to the border frame of the innerspring unit, a soft fiber pad overlying the hard fiber pad, an electrical heating unit overlying the soft fiber pad and including a flexible sheet and an elongated heating element laced at regular intervals through the flexible sheet in regularly spaced reversing rows, the flexible sheet of the electrical heating unit extending over and secured to the border frame of the innerspring unit, a quilted cover overlying the electrical heating unit, and including a soft fiber pad and an undersheet which extends over and is secured to the border frame of the innerspring unit.

6. An electrically heated mattress comprising, an innerspring unit, a wire grid overlying the upper surface of the innerspring unit, a hard fiber pad overlying the grid, a soft fiber pad overlying the hard fiber pad, an electrical heating unit overlying the soft fiber pad and including a flexible sheet and an electrical heating element carried thereby, and a quilted cover including a soft fiber pad overlying the electrical heating unit.

7. An electrically heated mattress comprising, an innerspring unit having a border frame, a wire grid overlying the upper surface of the innerspring unit, a hard fiber pad overlying the grid and extending over and secured to the border frame of the innerspring unit, a soft fiber pad overlying the hard fiber pad, an electrical heating unit overlying the soft fiber pad and including a flexible sheet and an electrical heating element carried thereby, a quilted cover overlying the electrical heating unit and including a soft fiber pad and an under sheet which extends over and is secured to the border frame of the innerspring unit, the flexible sheet of the electrical heating unit being marginally secured to the under sheet of the quilted cover.

8. An electrically heated mattress comprising, an innerspring unit having a border frame, a wire grid overlying the upper surface of the innerspring unit, a hard fiber pad overlying the grid and extending over and secured to the border frame of the innerspring unit, a soft fiber pad overlying the hard fiber pad, an electrical heating unit overlying the soft fiber pad and including a flexible sheet and an electrical heating element carried thereby, the flexible sheet of the electrical heating unit extending over and secured to the border frame of the innerspring unit, a quilted cover overlying the electrical heating unit and including a soft fiber pad and an under sheet which extends over and is secured to the border frame of the innerspring unit.

9. An electrically heated mattress comprising, an innerspring unit, a wire grid overlying the upper surface of the innerspring unit, a hard fiber pad overlying the grid, a soft fiber pad overlying the hard fiber pad, an electrical heating unit overlying the soft fiber pad and including a flexible sheet and an electrical heating element carried thereby, a quilted cover including a soft fiber pad overlying the electrical heating unit, a border panel secured to the quilted cover, and an extension cord extending into the mattress and electrically connected to the electrical heating element.

10. An electrically heated mattress comprising, an innerspring unit, a wire grid overlying the upper surface of the innerspring unit, a hard fiber pad overlying the grid, a soft fiber pad overlying the hard fiber pad, an electrical heating unit overlying the soft fiber pad and including a flexible sheet and an electrical heating element carried thereby, a quilted cover including a soft fiber pad overlying the electrical heating unit, a border panel secured to the quilted cover, and an extension cord extending into the mattress at the juncture of the border panel and quilted cover and electrically connected to the electrical heating element.

11. An electrically heated mattress comprising, an innerspring unit, a wire grid overlying the upper surface of the innerspring unit, a hard fiber pad overlying the grid, a soft fiber pad overlying the hard fiber pad, an electrical heating unit overlying the soft fiber pad and including a flexible sheet and an electrical heating element carried thereby, a quilted cover including a soft fiber pad overlying the electrical heating unit, a border panel secured to the quilted cover, and an extension cord extending into the mattress through the border panel and electrically connected to the electrical heating element.

OLIVER D. WESTERBERG.
WALLACE H. ENGLEHARDT.

REFERENCES CITED

The following references are of record in the file of this patent:

UNITED STATES PATENTS

| Number | Name | Date |
| --- | --- | --- |
| 1,835,212 | Fowler | Dec. 8, 1931 |
| 1,837,117 | Dunbar | Dec. 15, 1931 |
| 1,881,198 | Kirk | Oct. 4, 1932 |
| 1,957,401 | Wiedenmann | May 1, 1934 |
| 2,012,631 | Kindermann et al. | Aug. 27, 1935 |
| 2,162,021 | Kidwell | June 13, 1939 |
| 2,265,535 | Lubeck | Dec. 9, 1941 |
| 2,317,189 | Heiser et al. | Apr. 20, 1943 |
| 2,376,902 | Clark | May 29, 1945 |
| 2,439,892 | Huck | Apr. 20, 1948 |
| 2,569,138 | Abbott | Sept. 25, 1951 |

FOREIGN PATENTS

| Number | Country | Date |
| --- | --- | --- |
| 201,348 | Great Britain | Aug. 2, 1923 |